(12) United States Patent
Cravener et al.

(10) Patent No.: US 11,971,277 B2
(45) Date of Patent: Apr. 30, 2024

(54) ANISOTROPIC MAGNETO-RESISTIVE SENSOR FLAP-MEASURING SYSTEMS

(71) Applicant: Bell Textron Inc., Fort Worth, TX (US)

(72) Inventors: Kyle Thomas Cravener, Arlington, TX (US); Patrick Smith, Fort Worth, TX (US); Troy Cyril Schank, Keller, TX (US); Brady Garrett Atkins, Euless, TX (US); Kynn Jerald Schulte, Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 88 days.

(21) Appl. No.: 17/555,104

(22) Filed: Dec. 17, 2021

(65) Prior Publication Data

US 2023/0194312 A1 Jun. 22, 2023

(51) Int. Cl.
*G01D 5/16* (2006.01)
*B64C 27/39* (2006.01)

(52) U.S. Cl.
CPC ........... *G01D 5/16* (2013.01); *B64C 27/39* (2013.01)

(58) Field of Classification Search
CPC ... G01D 5/12; G01D 5/14; G01D 5/16; B64C 27/008; B64C 27/32; B64C 27/37; B64C 27/39
See application file for complete search history.

(56) References Cited

U.S. PATENT DOCUMENTS

| | | |
|---|---|---|
| 5,011,373 A | 4/1991 | Aubry et al. |
| 5,749,540 A | 5/1998 | Arlton |
| 6,616,095 B2 | 9/2003 | Stamps et al. |
| 8,004,277 B2 | 8/2011 | Patil et al. |
| 8,070,090 B2 | 12/2011 | Tayman |
| 8,955,792 B2 | 2/2015 | Schank |
| 9,605,978 B2 | 3/2017 | Ausserlechner et al. |
| 9,657,582 B2 | 5/2017 | Haldeman et al. |
| 9,809,303 B2 | 11/2017 | Schank |
| 10,011,367 B2 | 7/2018 | Dillon |
| 10,384,771 B2 | 8/2019 | Haldeman et al. |
| 10,577,096 B2 | 3/2020 | Roberts et al. |
| 10,829,242 B2 | 11/2020 | Cravener et al. |
| 10,960,969 B2 | 3/2021 | Choi et al. |
| 11,136,116 B2 | 10/2021 | Maresh et al. |
| 2009/0278638 A1 | 11/2009 | Giroud et al. |

(Continued)

OTHER PUBLICATIONS

Cravener, Kyle Thomas, "Anistropic Magneto-Resistive Sensor Flap-Measuring On Gimballed Hub", U.S. Appl. No. 18/115,213, filed Feb. 28, 2023, 56 pages.

(Continued)

*Primary Examiner* — Huy Q Phan
*Assistant Examiner* — David B Frederiksen
(74) *Attorney, Agent, or Firm* — Bradley Arant Boult Cummings LLP

(57) ABSTRACT

A rotor-hub-flap anisotropic-sensor system includes a rotor hub, a plurality of anisotropic-sensor arrangements interoperably coupled to the rotor hub and operable to measure flapping of the rotor hub, a plurality of rotor blades connected to the rotor hub, and at least one flight control computer interoperably coupled to the plurality of anisotropic-sensor arrangements.

12 Claims, 8 Drawing Sheets

(56) References Cited

U.S. PATENT DOCUMENTS

| | | | | |
|---|---|---|---|---|
| 2012/0053851 A1* | 3/2012 | Baller | ............... | F03D 1/0658 |
| | | | | 416/61 |
| 2013/0092786 A1* | 4/2013 | Kellner | ............. | B64C 27/008 |
| | | | | 244/17.13 |
| 2013/0243597 A1* | 9/2013 | Perrin | ................ | B64C 27/35 |
| | | | | 416/131 |
| 2014/0145025 A1* | 5/2014 | Fang | ................ | B64C 27/008 |
| | | | | 244/17.11 |
| 2014/0271188 A1* | 9/2014 | Dillon | ............... | B64C 27/008 |
| | | | | 416/61 |
| 2015/0069175 A1* | 3/2015 | Schank | .............. | G01B 7/003 |
| | | | | 324/207.21 |
| 2015/0210382 A1* | 7/2015 | Dempsey | .......... | B64C 11/301 |
| | | | | 416/134 A |
| 2016/0224030 A1* | 8/2016 | Wulff | ............... | G05D 1/0858 |
| 2016/0258781 A1* | 9/2016 | Ausserlechner | ....... | G01D 5/16 |
| 2017/0203838 A1* | 7/2017 | Thomas | ............. | B64C 27/78 |
| 2018/0155015 A1* | 6/2018 | Thompson | ........ | B64C 27/008 |
| 2021/0179263 A1* | 6/2021 | Sayyah | .............. | B64C 27/04 |
| 2021/0269148 A1 | 9/2021 | Cravener | | |
| 2021/0291960 A1 | 9/2021 | Maresh et al. | | |

OTHER PUBLICATIONS

Cravener, Kyle Thomas, "Universal-Joint Rotor-Hub Method and System", U.S. Appl. No. 18/115,220, filed Feb. 28, 2023, 58 pages.
Cravener, Kyle Thomas et al., "Anisotropic Magneto-Resistive Sensor Flap Measuring Systems", U.S. Appl. No. 17/555,024, filed Dec. 17, 2021, 44 pages.

* cited by examiner

ANISOTROPIC MAGNETO-RESISTIVE SENSOR FLAP-MEASURING SYSTEMS

TECHNICAL FIELD

The present disclosure relates generally to systems and methods for measuring rotor-blade flapping in vertical takeoff and landing ("VTOL") rotary aircraft and more particularly, but not by way of limitation, to systems and methods employing anisotropic magneto-resistive ("AMR") sensors.

BACKGROUND

This section provides background information to facilitate a better understanding of the various aspects of the disclosure. It should be understood that the statements in this section of this document are to be read in this light, and not as admissions of prior art.

Rotor-blade flapping-measurement systems have used rotary-variable-differential transducer ("RVDT") sensors. However, such systems have a number of drawbacks, including size, weight, cost, complexity of electronics, and senstivity to temperature and mechanical vibration.

SUMMARY

This summary is provided to introduce a selection of concepts that are further described below in the detailed description. This summary is not necessarily intended to identify key or essential features of the claimed subject matter, nor is it intended to be used as an aid in limiting the scope of claimed subject matter.

A rotor-hub-flap anisotropic-sensor system includes a rotor hub, a plurality of anisotropic-sensor arrangements interoperably coupled to the rotor hub and operable to measure flapping of the rotor hub, a plurality of rotor blades connected to the rotor hub, and at least one flight control computer interoperably coupled to the plurality of anisotropic-sensor arrangements.

A rotor-hub-flap anisotropic-sensor arrangement includes a plurality of anisotropic sensors coupled to a flight control computer and a rotor hub and at least one magnet associated with the plurality of anisotropic sensors.

A rotor-hub-flap anisotropic-sensor system includes a plurality of anisotropic-sensor arrangements interoperably coupled to a rotor hub and operable to measure flapping of the rotor hub, each of the plurality of anisotropic-sensor arrangements including a magnet, a first anisotropic sensor interoperably coupled to the magnet, and a second anisotropic sensor interoperably coupled to the magnet. The rotor-hub-flap anisotropic-sensor system also includes at least one flight control computer interoperably coupled to the plurality of anisotropic-sensor arrangements.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Various embodiments will now be described more fully with reference to the accompanying drawings. The disclosure may, however, be embodied in many different forms and should not be construed as limited to the embodiments set forth herein.

Figure 1:
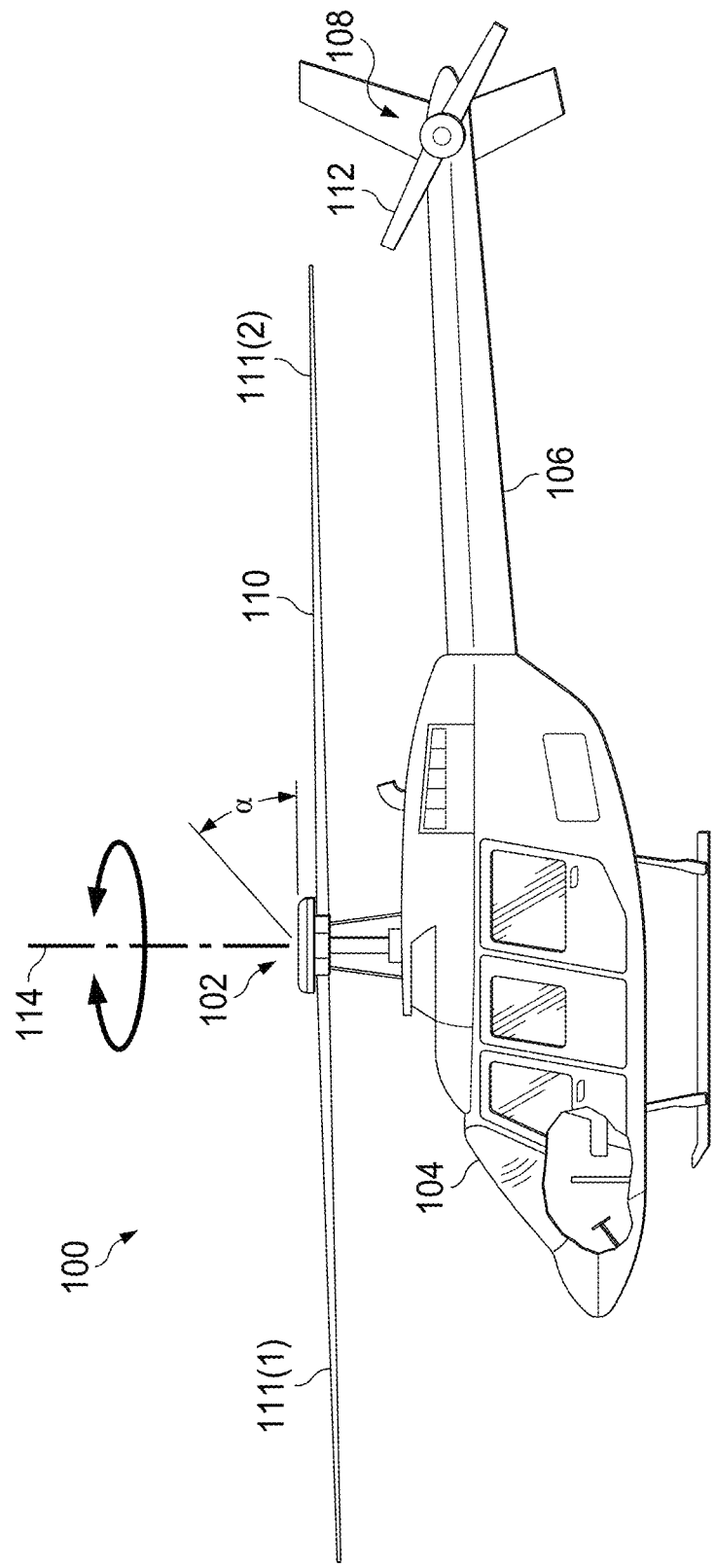
FIG. 1 is an illustrative vertical takeoff and landing ("VTOL") rotary aircraft.

FIG. 1 is an illustrative vertical takeoff and landing ("VTOL") rotary aircraft 100. The rotary aircraft 100 includes a rotor system 102, a fuselage 104, and a tail boom 106. The tail boom 106 carries an anti-torque system 108. The rotor system 102 includes a main rotor 110 that includes a plurality of rotor blades for creating flight, a rotor blade 111(1) and a rotor blade 111(2) being shown in FIG. 1, although a different number of rotor blades could be used other than two as illustrated. The rotor system 102 may include a control system for selectively controlling pitch of each of the plurality of rotor blades 111(1) and 111(2) of the main rotor 110 to control direction, thrust, and lift of the rotary aircraft 100. The anti-torque system 108 includes a tail rotor 112. The tail rotor 112 provides thrust to counter torque due to rotation of the main rotor 110 about a main-rotor axis 114. The rotor blades 111(1) and 111(2) are shown as perpendicular to the main-rotor axis 114, at which orientation relative to the main rotor 110 a rotor-blade-flapping angle α=0°.

Figure 2:
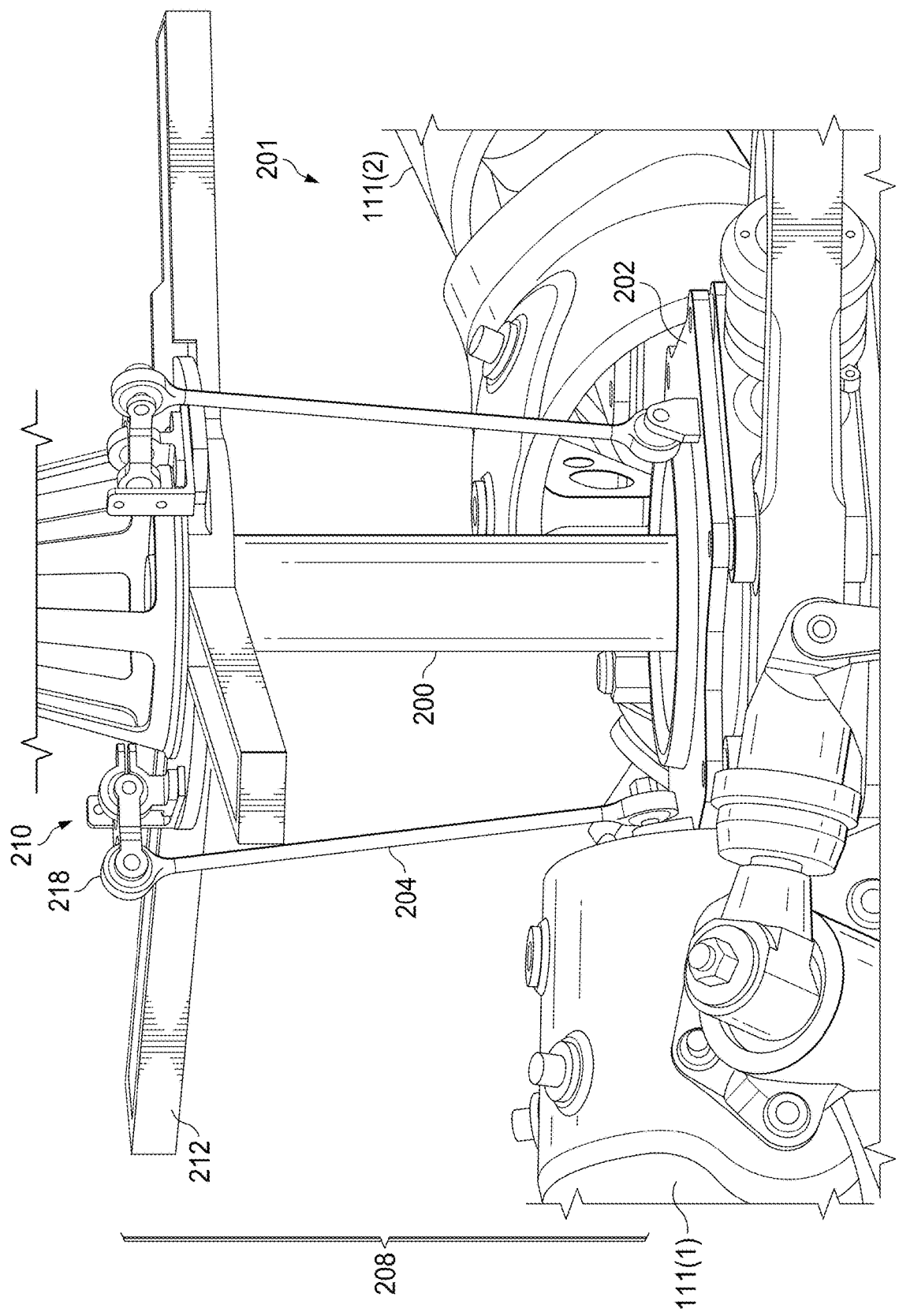
FIG. 2 shows the rotor system of FIG. 1 in more detail according to one illustrative embodiment.

FIG. 2 shows the rotor system 102 of FIG. 1 in more detail according to one illustrative embodiment. In the example of FIG. 2, the rotor system 102 includes a shaft 200 and a rotor hub 202. The rotor hub 202 couples the rotor blades 111(1) and 111(2) of the main rotor 110 to the shaft 200, the rotor blades 111(1) and 111(2) being shown only in part. In some examples, the rotor system 102 may include more or fewer components, not all of which are necessarily shown or are shown but not labeled with a reference numeral in FIG. 2 for purposes of clarity.

The shaft 200 and the rotor hub 202 are examples of mechanical components that generate and transmit torque and rotation. A power train of which the shaft 200 and the rotor hub 202 are a part may include a variety of components, such as, for example, an engine, a transmission, and differentials. In operation, the shaft 200 receives torque and rotates the rotor hub 202 about the main-rotor axis 114. The rotor blades 111(1) and 111(2) are coupled to the rotor hub 202 such that rotation of the rotor hub 202 causes the rotor blades 111(1) and 111(2) to rotate about the shaft 200.

The rotor blades 111(1) and 111(2) may be subject to a variety of different forces. For example, rotation of the rotor blades 111(1) and 111(2) may result in a centrifugal ("CF") force against the rotor blades 111(1) and 111(2) in a direction away from the shaft 200. In addition, weight of the rotor blades 111(1) and 111(2) may result in a transverse force being applied against the rotor hub 202. These and other forces may cause the rotor blades 111(1) and 111(2) to feather, drag (i.e, lead/lag), and flap during flight of the rotary aircraft 100.

The term rotor-blade flapping generally refers to up-and-down motion (i.e., in a direction parallel to the main-rotor axis 114) of a rotor blade during operation such that α≠0°. In the example of FIG. 2, the rotor blade 111(1) is shown at a substantially zero-degree rotor-blade flapping angle in which a is slightly less than zero, while the rotor blade 111(2) is shown at a substantially zero-degree rotor-blade flapping angle in which a is slightly greater than zero, zero degrees being 90° from the main-rotor axis 114. When rotor-blade flapping occurs, the rotor blades 111(1) and 111(2) deviate upward or downward, which deviation results in a non-zero value of the rotor-blade-flapping angle α.

The rotor system 102 includes a hub-flap measurement system 208. The hub-flap measurement system 208 measures flapping of the rotor hub 202 such that the rotor hub 202 is not perpendicular to the main-rotor axis 114. It will be appreciated that when the rotor hub 202 is not perpendicular to the main-rotor axis 114, an amount of hub flap will be different at different azimuthal positions of the rotor hub 202. The hub-flap measurement system 208 may be used to estimate flapping of the rotor blade 111(2) at a given azimuthal position by measuring flapping of the rotor hub 202, since the majority of blade flapping typically is the result of hub flapping. Although the hub-flap measurement system 208 is illustrated as aligned azimuthally with the blade 111(2), this need not necessarily be the case, since any suitable number of hub-flap measurement systems 208 may be arranged around a circumference of the rotor hub 202 as desired in a given implementation. The hub-flap measurement system 208 includes a flap-linkage arm 204, an anisotropic magneto-resistive ("AMR") sensor system 210, and a platform 212. The flap linkage couples the rotor hub 202 to the AMR sensor system 210, as described in more detail below.

The AMR sensor system 210 utilizes an AMR sensor. An AMR sensor has a function where resistance decreases when a magnetic field is applied and in which the function is dependent on a direction of magnetic force lines applied to the sensor. AMR sensors measure flux angle and not magnitude and can operate in a saturated condition, such that they are less susceptible to external influences and have increased sensitivity with decreased variation in measurement in comparison to rotary-variable differential-transformer ("RVDT") based systems. Many AMR sensors are programmable, which facilitates their use in a wide variety of applications. For purposes of this application, the term angle sensors includes both AMR sensors and giant magneto-resistive ("GMR") sensors, either of which may be used in systems and methods discussed herein. Outputs of many angle sensors may be analog or digital.

The platform 212, shown for example integrated into spinner-spoke mounts, supports the AMR sensor system 210 and couples the AMR sensor system 210 to the shaft 200. In the example of FIG. 2, the flap-linkage arm 204 is coupled to the AMR sensor system 210 and to the rotor hub 202, respectively, via a spherical bearing 216 and a spherical bearing 218. During operation, in an illustrative embodiment, flapping of the rotor blade 111(1) causes upward or downward movement of the rotor hub 202 such that a changes. Upward or downward movement of the rotor hub 202 causes the flap-linkage arm 204 to move, which movement is translated to the AMR sensor system 210 via the spherical bearing 218 so the AMR sensor system 210 may use an AMR sensor, discussed in more detail below, contained therein to measure an amount of flapping of the rotor hub 202. The AMR sensor system 210 is configured, in a typical embodiment, to rotate with the shaft 200 during operation. The hub-flap measurement system 208 does not directly measure flapping of the rotor blade 111(1); rather, the hub-flap measurement system 208 measures movement of the rotor hub 202 at the spherical bearing 216 and, based thereon, estimates flapping of the rotor blade 111(1) based on movement of the rotor hub 202 at the spherical bearing 216. A second hub-flap measurement system (unnumbered) is shown in FIG. 2. It will be appreciated that the second hub-flap measurement system is analogous to the hub-flap measurement system 208 and that, in a typical embodiment, a hub-flap measurement system is associated with each rotor blade 111(1)-111(n) of a given VTOL rotary aircraft.

Measurements provided by the hub-flap measurement system 208 alone may be of limited value. For example, the hub-flap measurement system 208 does not itself include mechanisms for correlating measurements with rotor-blade azimuthal rotational positions. Therefore, even if the hub-flap measurement system 208 accurately measures rotor-blade flapping angles, for example, the hub-flap measurement system 208 alone is not able to calculate at which points of a 360° rotational azimuth of the main rotor 110 given measurements occur.

Figure 3:
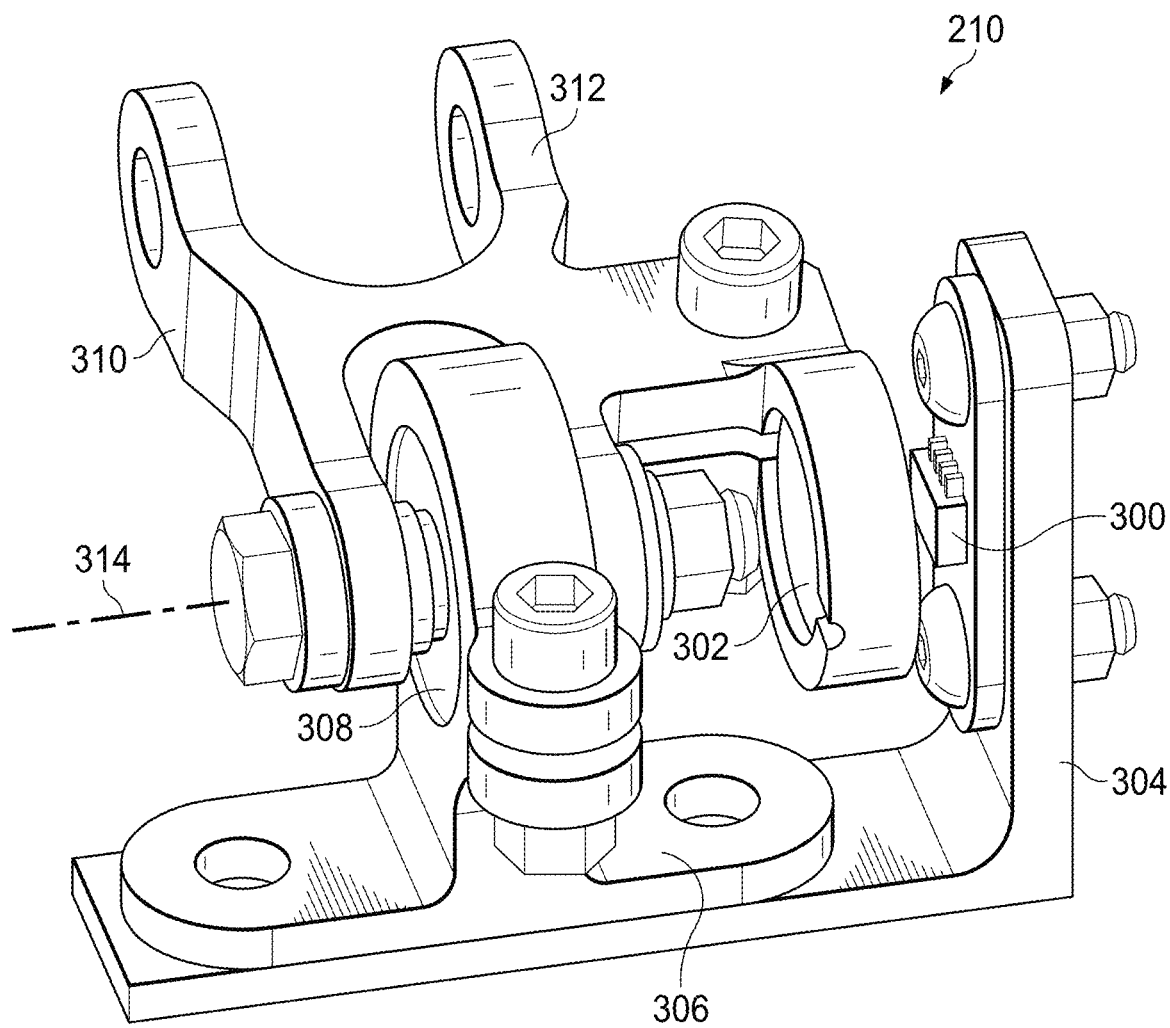
FIG. 3 illustrates an AMR sensor system in detail.

FIG. 3 illustrates the AMR sensor system 210 in more detail. As shown in FIG. 3, the AMR sensor system 210 includes an AMR sensor 300, a magnet 302, a mounting bracket 304 (shown as an L bracket), a bearing housing 306, a bearing 308 housed by the bearing housing 306, and a sensor arm 310. The magnet 302 may be, for example, a Neodymium magnet or a Cobalt magnet. In the embodiment shown, the AMR sensor 300 is mounted to the mounting bracket 304 and the magnet 302 is mounted to the sensor arm 310; however, the AMR sensor 300 could be mounted to the sensor arm 310 and the magnet 302 mounted to the mounting bracket 304 without departing from principles disclosed herein. The bearing 308, which is mounted within the bearing housing 306, is typically a ball bearing, although other suitable types of bearings such as a needle-roller bearing or a TEFLON bearing may be used.

The magnet 302 and the AMR sensor 300 are positioned so as to be near one another in order that the AMR sensor 300 can detect relative rotation between the AMR sensor and the magnet 302. The sensor arm 310 includes a spherical-bearing mounting section 312, to which the flap-linkage arm 204 is connected via the spherical bearing 218. Flapping of the rotor hub 202 causes the flap-linkage arm 204 to move up or down in response thereto. As the flap-linkage arm 204 moves, the spherical-bearing mounting section 312 and the magnet 302 are caused to rotate about a rotational axis 314 of the bearing 308. The AMR sensor 300 mounted adjacent to the magnet 302 is able to measure an amount of the rotation of the magnet 302 about the rotational axis 314.

Even though AMR sensors have a number of advantages relative to RVDT sensors, many AMR sensors do not have the robust in-line monitoring capabilites of RVDT sensors; therefore, several AMR-sensor-based architectures are outlined below that can be utilized to identify erroneous AMR sensing. In typical embodiments, full-channel independence of both power and signal are implemented and concepts can be applied to federated or distributed architectures.

Figure 4A:
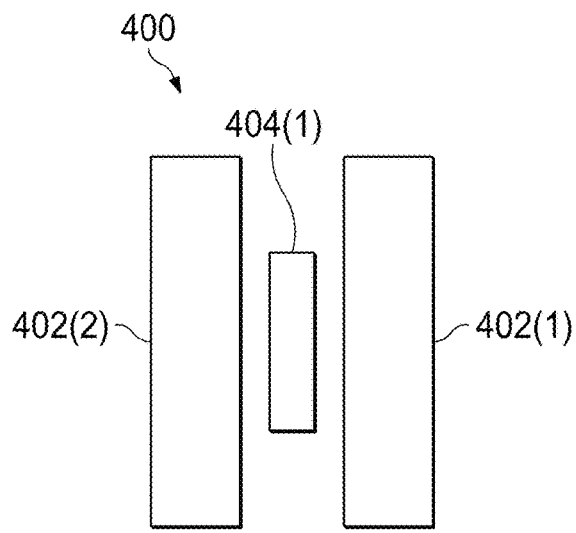
FIGS. 4A-C show sensor arrangements that employ the AMR sensor.
Figure 4B:
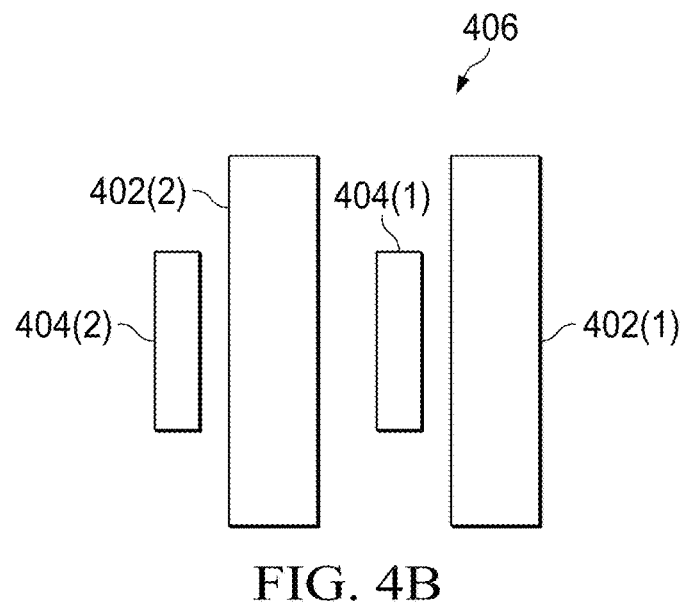
Figure 4C:
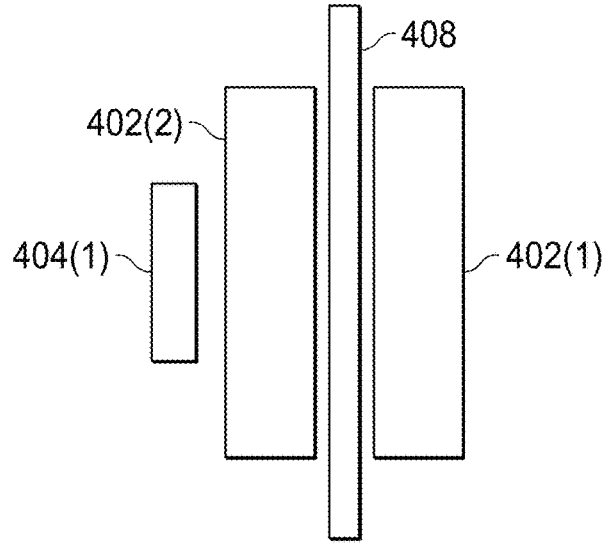

FIGS. 4A-4C illustrate different configurations in which multiple AMR sensors and magnets are utilized in order to identify erroneous AMR sensing. Any of the configurations can be employed in embodiments of an AMR sensor system similar to the AMR sensor system 210.

FIG. 4A shows a sensor arrangement 400 that includes an AMR sensor 402(1) and an AMR sensor 402(2) on either side of a magnet 404(1). As noted above, either the magnet 404(1) or the AMR sensors 402(1) and 402(2) could rotate with the other being held stationary. It will be appreciated that, in the sensor arrangement 400, each of the AMR sensors 402(1) and 402(2) senses relative rotation with respect to the magnet 404(1) and, in the event of a failure of one of the AMR sensors 402(1) or 402(2), sensing of relative rotation could still be accomplished.

FIG. 4B shows a sensor arrangement 406 that includes the AMR sensors 402(1) and 402(2) as well as the magnet 404(1) and a magnet 404(2). The magnets 404(1) and 404(2) are each paired with a respective one of the AMR sensors 402(1) and 402(2), such that two independent magnet-AMR-sensor pairs that are sufficiently magnetically distant from one another are utilized to reduce the chance of a common mode failure, especially in situations in which a common mode could validate a measurement in a given architecture.

FIG. 4C shows a sensor arrangement 410 that includes the AMR sensors 402(1) and 402(2) as well as the magnet 404(1) and an intermediate circuit board 408, on either side of which are mounted the AMR sensors 402(1) and 402(2). In the sensor arrangement 410, each of the AMR sensors 402(1) and 402(2) is able to sense relative rotation of the magnet 404(1).

Figure 5:
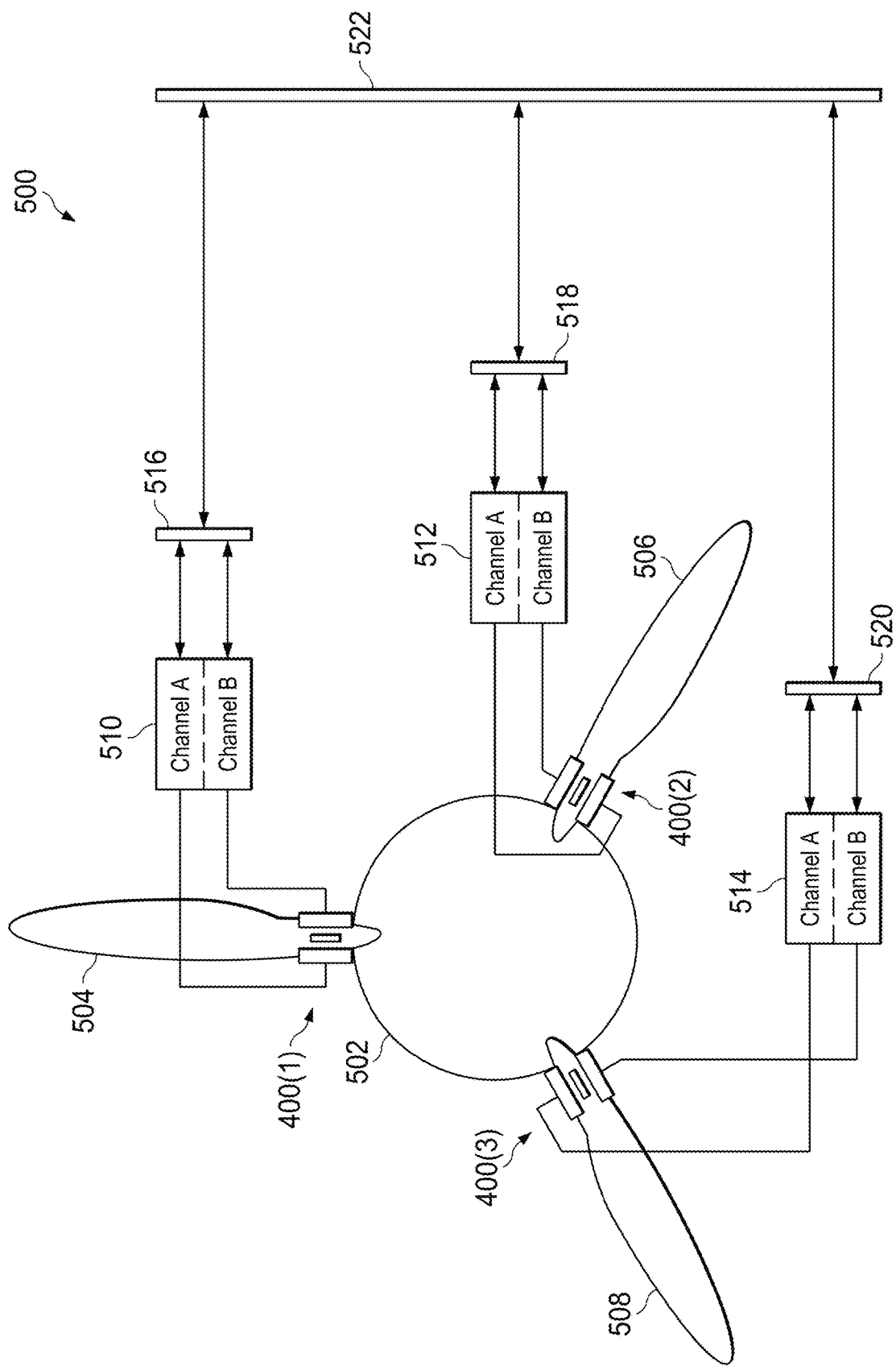
FIG. 5 illustrates a sensor system that utilizes multiple sensor arrangements.

FIG. 5 illustrates a sensor system that utilizes multiple sensor arrangements 400. A sensor system 500 includes a hub 502 and a rotor blade 504, a rotor blade 506, and a rotor blade 508 extending from the hub 502. The hub 502 has three sensor arrangements 400(1), 400(2), and 400(3) associated therewith, each of which is aligned azimuthally with one of the rotor blades 504, 506, and 508, respectively. The sensor system 500 may be referred to as a dual triplex architecture. As noted above, the sensor arrangements 400 (1)-(3) need not necessarily be so aligned.

Each of the sensor arrangements 400(1), 400(2), and 400(3) includes a pair of AMR sensors and a magnet. Each of the AMR sensors is inter-operably coupled to a respective channel of a flight control computer ("FCC"), FCC 510, FCC 512, and FCC 514 being associated with sensor arrangements 400(1), 400(2), and 400(3), respectively. Each of the FCC 510, 512, and 514 has a channel A and a channel B inter-operably coupled to a given AMR sensor, each of which channels is output to respective data buses 516, 518, and 520. Data buses 516, 518, and 520 are each inter-operably coupled to a cross channel datalink ("CCDL") 522.

Each of the FCC 510, FCC 512, and FCC 514 can identify erroneous sensing by its associated sensor arrangement 400(1), 400(2), and 400(3) by comparing measurement across channels A and B or comparing flapping solutions across channels. In a typical embodiment, a mis-compare by one of the FCC 510, FCC 512, and FCC 514 between channels A and B identifies a solution as invalid. In some embodiments, even if a mis-compare occurs, the sensor system 500 can continue to operate in spite of the mis-compare based on valid measurements of one or more of the remaining FCCs.

Figure 6:
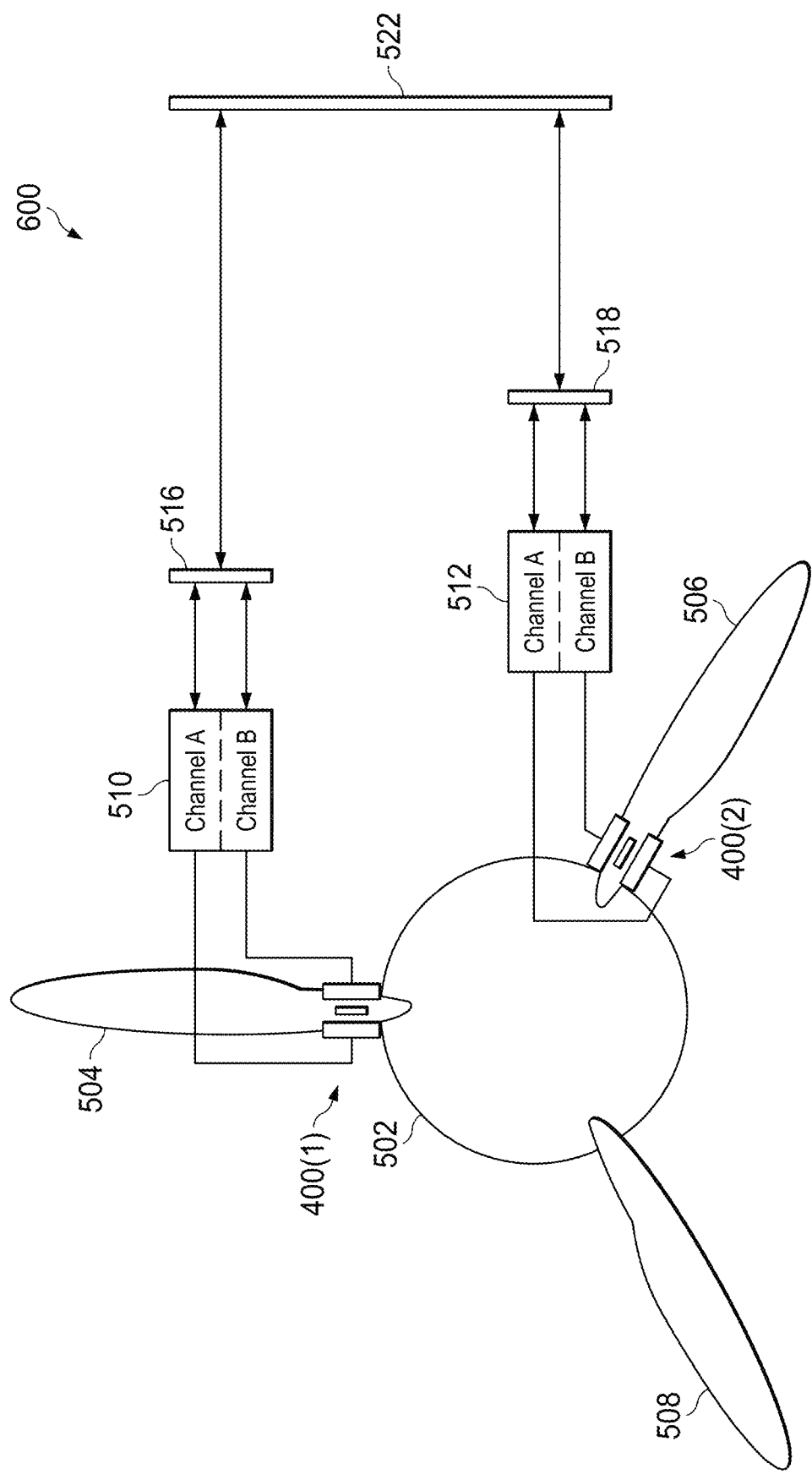
FIG. 6 illustrates a sensor system that utilizes multiple sensor arrangements.

FIG. 6 illustrates illustrates a sensor system that utilizes multiple sensor arrangements 400. A sensor system 600 includes the hub 502 the rotor blade 504, the rotor blade 506, and the rotor blade 508 extending from the hub 502. The hub 502 has two sensor arrangements 400(1) and 400(2) associated therewith, each of which is aligned azimuthally with one of the rotor blades 504 and 506, respectively. The sensor system 500 may be referred to as a dual duplex architecture. As noted above, the sensor arrangements 400(1)-(2) need not necessarily be so aligned.

Each of the sensor arrangements 400(1) and 400(2) includes a pair of AMR sensors and a magnet. Each of the AMR sensors is inter-operably coupled to a respective channel of a flight control computer ("FCC"), FCC 510 and FCC 512 being associated with the sensor arrangements 400(1) and 400(2), respectively. Each of the FCC 510 and 512 has a channel A and a channel B inter-operably coupled to a given AMR sensor, each of which channels is output to respective data buses 516 and 518. Data buses 516 and 518 are each inter-operably coupled to the cross channel datalink ("CCDL") 522.

Each of the FCC 510 and the FCC 512 can identify erroneous sensing by its associated sensor arrangement 400(1) and 400(3) by comparing measurement across channels A and B or comparing flapping solutions across channels. In a typical embodiment, In a typical embodiment, a mis-compare by one of the FCC 510 and FCC 512 between channels A and B identifies a solution as invalid. In some embodiments, even if a mis-compare occurs, the sensor system 600 can continue to operate in spite of the mis-compare based on valid measurements of one or more of the remaining FCCs.

Figure 7:
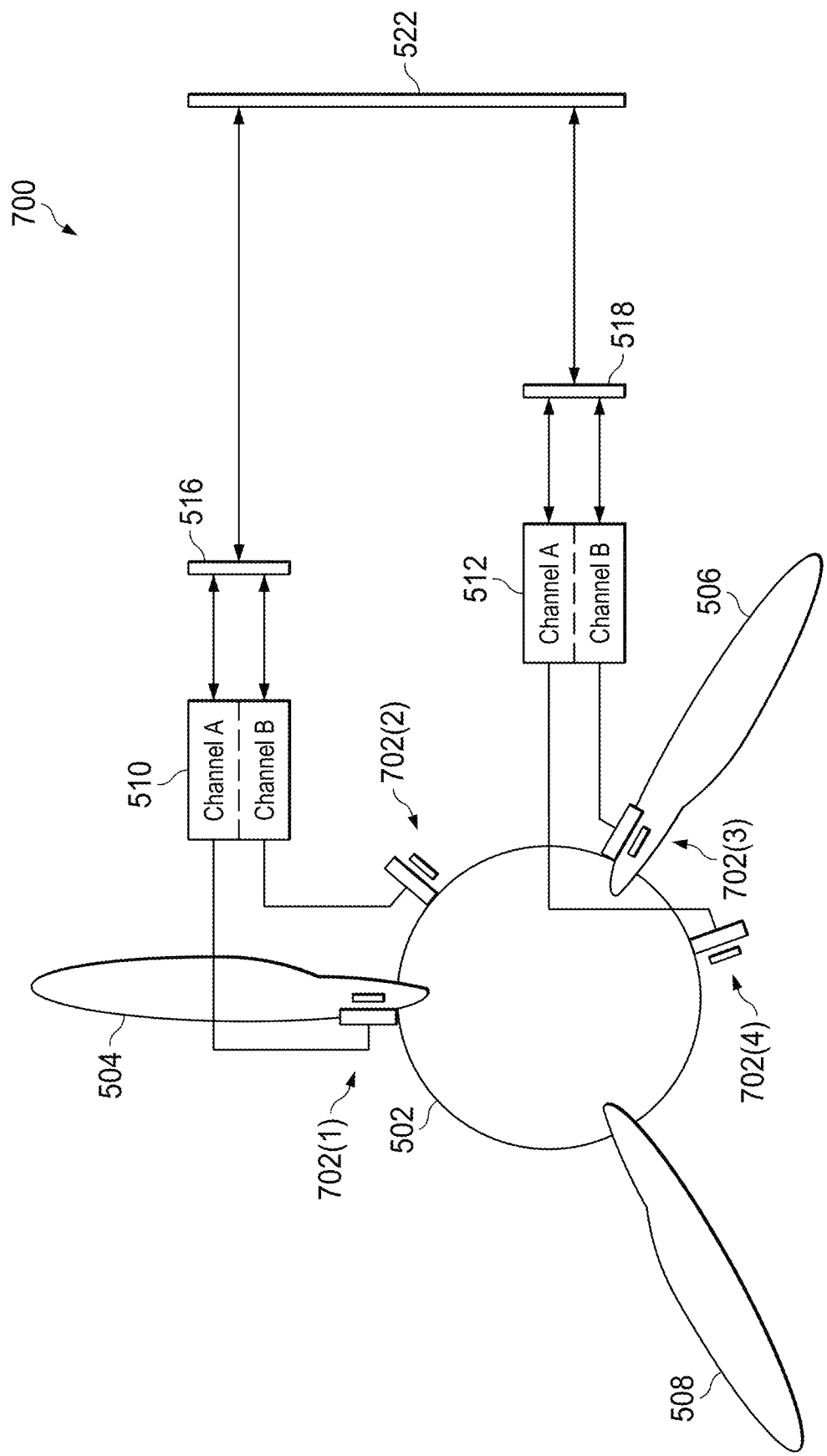
FIG. 7 illustrates a sensor system that utilizes multiple sensor arrangements.

FIG. 7 illustrates a sensor system that utilizes multiple sensor arrangements 702. A sensor system 700 includes the hub 502, the rotor blade 504, the rotor blade 506, and the rotor blade 508 extending from the hub 502. The hub 502 has four sensor arrangements 702(1), 702(2), 702(3), and 702(4) associated therewith, the sensor arrangement 702(1) and the sensor arrangement 702(3) being aligned azimuthally with the rotor blades 504 and 506, respectively, the sensor arrangement 702(2) and the sensor arrangement 702(4) being offset azimuthally from any of the rotor blades 504, 506, and 508. Each of the sensor arrangements 702(1)-(3) includes only a single magnet and a single AMR sensor. The sensor system 500 may be referred to as a dual duplex architecture.

Each of the AMR sensors is inter-operably coupled to a respective channel of a flight control computer ("FCC"), FCC 510 and FCC 512 being associated with the sensor arrangements 702(1), 702(2), 702(3), and 702(4), respectively, as indicated in FIG. 7. In other words, sensor arrangements 702(1), 702(2), 702(3), and 702(4) are associated with channel A of the FCC 510, channel B of the FCC 512, channel A of the FCC 512, and channel B of the FCC 512. Data buses 516 and 518 are each inter-operably coupled to a cross channel datalink ("CCDL") 522.

Each of the FCC 510 and 512 can identify erroneous sensing by one of its associated sensor arrangements 702 (1)-(4) by comparing flapping solutions across channels. In a typical embodiment, a mis-compare by one of the FCC 510 and the FCC 512 identifies a solution as invalid. In some embodiments, even if a mis-compare occurs, the sensor system 700 can continue to operate in spite of the mis-compare based on valid measurements of the remaining FCC.

Figure 8:
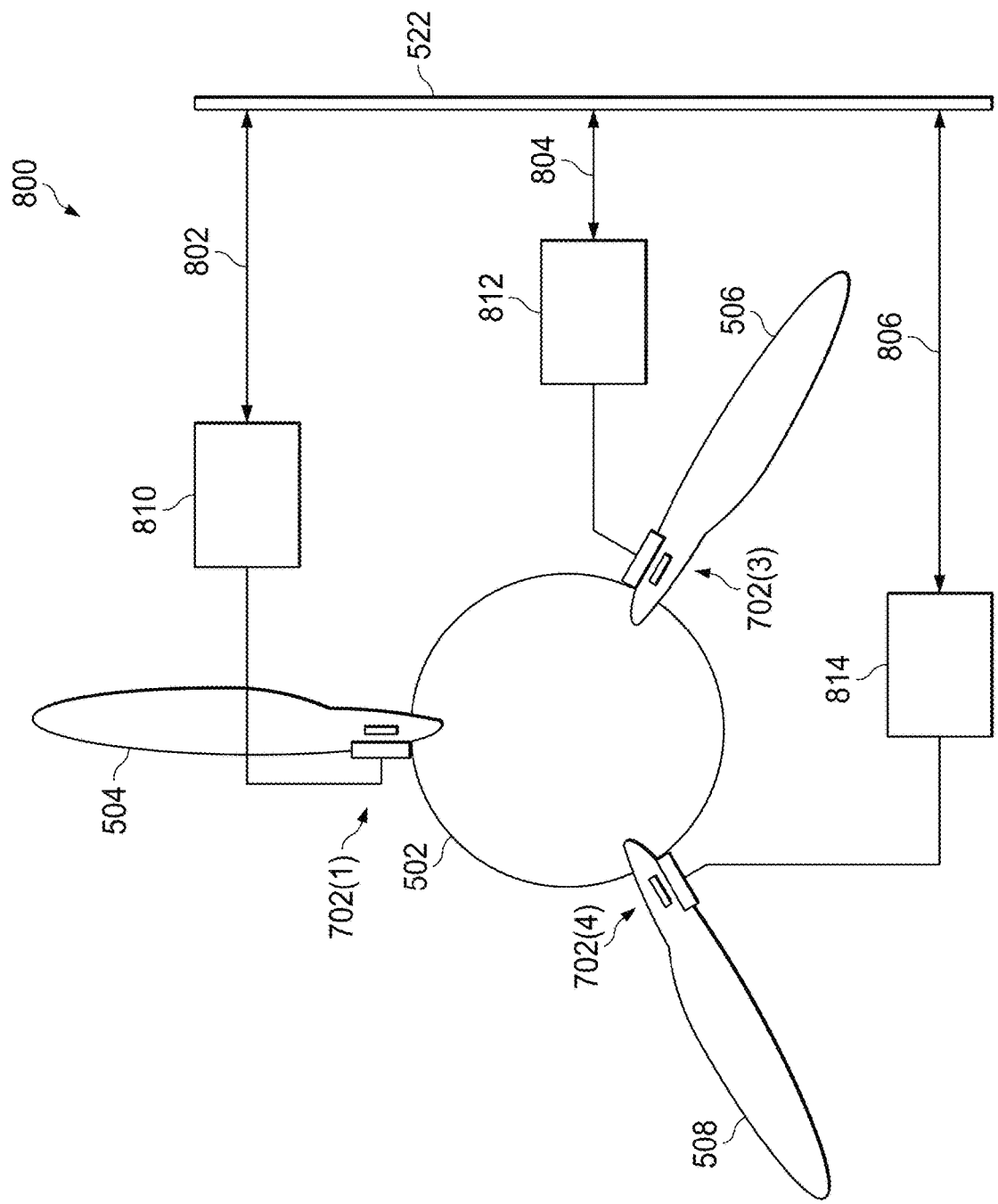
FIG. 8 illustrates a sensor system that utilizes multiple sensor arrangements.

FIG. 8 illustrates a sensor system that utilizes multiple sensor arrangements 702. A sensor system 700 includes the hub 502, the rotor blade 504, the rotor blade 506, and the rotor blade 508 extending from the hub 502. The hub 502 has three sensor arrangements 702(1), 702(2), and 702(4) associated therewith, each of which is aligned azimuthally with one of the rotor blades 504, 506, and 508, respectively. The sensor system 500 may be referred to as a single triplex architecture. As noted above, the sensor arrangements 702 (1), 702(2), and 702(4) need not necessarily be so aligned.

Each of the sensor arrangements 702(1), 702(2), and 70243) includes an AMR sensor and a magnet. Each of the AMR sensors is inter-operably coupled to a flight control computer ("FCC"), FCC 510, FCC 512, and FCC 514 being associated with sensor arrangements 702(1), 702(2), and 702(4), respectively. Each of the FCC 510, 512, and 514 is inter-operably coupled to a given AMR sensor, each of which outputs a signal to respective data buses 516, 518, and 520. Data buses 516, 518, and 520 are each inter-operably coupled to a cross channel datalink ("CCDL") 522. In a typical embodiment, the sensor system 800 can identify erroneous sensing by a process of comparing outputs of the sensor arrangements 702(1), 702(2), and 702(4) and applying a voting algorithm of flapping solutions among the FCC 510, FCC 512, and FCC 514.

In addition to the capabilities of the architectures described relative to FIGS. 5-8, an additional layer of failure robustness can be achieved in the case all system FCCs have invalid measurements. For example, in the dual duplex embodiment of FIG. 5, if two channels of a given FCC have different sensor outputs, but the sensor system as a whole can determine that two sensors, each on a different FCC, yield an overall flapping solution that is in agreement, the agreed-upon flapping solution can be selected and utilized.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," and "about" may be substituted with "within 10% of" what is specified.

For purposes of this patent application, the term computer-readable storage medium encompasses one or more tangible computer-readable storage media possessing structures. As an example and not by way of limitation, a computer-readable storage medium may include a semiconductor-based or other integrated circuit (IC) (such as, for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of a controller as appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

In this patent application, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Python, Java, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A rotor-hub-flap anisotropic-sensor system comprising:
a rotor hub;
a plurality of anisotropic-sensor arrangements interoperably coupled to the rotor hub and operable to measure flapping of the rotor hub;
a plurality of rotor blades connected to the rotor hub; and
at least one flight control computer interoperably coupled to the plurality of anisotropic-sensor arrangements;
wherein at least one of the plurality of anisotropic-sensor arrangements comprises:
a first magnet having a first side and a second side;

a first anisotropic sensor arranged on the second side of the first magnet;
a second magnet arranged on a side of the first anisotropic sensor opposite the first magnet; and
a second anisotropic sensor arranged on a side of the second magnet opposite the first anisotropic sensor.

2. The rotor-hub-flap anisotropic-sensor system of claim 1, wherein at least one of the at least one flight control computer is a single-channel flight control computer.

3. The rotor-hub-flap anisotropic-sensor system of claim 1, wherein
the at least one flight control computer comprises two channels for each of the plurality of anisotropic-sensor arrangements, each of the two channels being interoperably coupled to one of the pair of anisotropic sensors.

4. The rotor-hub-flap anisotropic-sensor system of claim 1, wherein the plurality of anisotropic-sensor arrangements and the plurality of rotor blades are different in number.

5. The rotor-hub-flap anisotropic-sensor system of claim 4, wherein:
the plurality of anisotropic-sensor arrangements and the plurality of rotor blades are different in number; and
the number of anisotropic-sensor arrangements is fewer than the number of rotor blades.

6. The rotor-hub-flap anisotropic-sensor system of claim 1, wherein at least one of the plurality of anisotropic-sensor arrangements is not azimuthally aligned with any of the plurality of rotor blades.

7. The rotor-hub-flap anisotropic-sensor system of claim 1, comprising:
wherein the plurality of anisotropic-sensor arrangements comprise:
a first anisotropic-sensor arrangement azimuthally aligned with one of the plurality of rotor blades; and
a second anisotropic-sensor arrangement not azimuthally aligned with any of the plurality of rotor blades; and
the at least one flight control computer comprises two channels, one of the two channels being inter-operably coupled to the first anisotropic-sensor arrangement and one of the two channels being inter-operably coupled to the second anisotropic-sensor arrangement.

8. A rotor-hub-flap anisotropic-sensor arrangement comprising:
a plurality of anisotropic sensors coupled to a flight control computer and a rotor hub; and
at least one magnet associated with the plurality of anisotropic sensors;
wherein:
the at least one magnet is a single magnet;
the plurality of anisotropic sensors comprises a first anisotropic sensor and a second anisotropic sensor;
the first anisotropic sensor is arranged on a first side of the single magnet;
the second anisotropic sensor is arranged on the first side of the single magnet at a distance farther from the single magnet than the first anisotropic sensor; and
the first anisotropic sensor and the second anisotropic sensor are mounted on opposite sides of an intermediate circuit board.

9. A rotor-hub-flap anisotropic-sensor system comprising:
a plurality of anisotropic-sensor arrangements interoperably coupled to a rotor hub and operable to measure flapping of the rotor hub, each of the plurality of anisotropic-sensor arrangements comprising:
a magnet;
a first anisotropic sensor interoperably coupled to the magnet; and
a second anisotropic sensor interoperably coupled to the magnet; and
at least one flight control computer interoperably coupled to the plurality of anisotropic-sensor arrangements;
wherein:
the magnet is a first magnet having a first side and a second side;
the first anisotropic sensor is arranged on the second side of the first magnet;
each of the plurality of anisotropic-sensor arrangements comprises a second magnet arranged on a side of the first anisotropic sensor opposite the first magnet; and
the second anisotropic sensor is arranged on a side of the second magnet opposite the first anisotropic sensor.

10. The rotor-hub-flap anisotropic-sensor system of claim 9, wherein:
the first anisotropic sensor is arranged on the first side of the magnet;
the second anisotropic sensor is arranged on the second side of the magnet; and
wherein the first side and the second side are on opposite sides of the magnet.

11. The rotor-hub-flap anisotropic-sensor system of claim 9, wherein:
the first anisotropic sensor is arranged on the first side of the magnet; and
the second anisotropic sensor is arranged on the first side of the magnet at a distance farther from the magnet than the first anisotropic sensor.

12. The rotor-hub-flap anisotropic-sensor system of claim 9, wherein each of the plurality of anisotropic-sensor arrangements is azimuthally aligned with one of a plurality of rotor blades connected to the rotor hub.

* * * * *